(12) United States Patent
Nadumane et al.

(10) Patent No.: US 11,064,009 B2
(45) Date of Patent: Jul. 13, 2021

(54) AUGMENTED REALITY-BASED WIRING, COMMISSIONING AND MONITORING OF CONTROLLERS

(71) Applicant: Honeywell International Inc., Morristown, NJ (US)

(72) Inventors: Venugopala Kilingar Nadumane, Bangalore (IN); Poornima Gubbi Venkataramu, Bangalore (IN); Erwan Rivet, Nyon (CH); Graham Whiting, West Sussex (GB)

(73) Assignee: Honeywell International Inc., Charlotte, NC (US)

( * ) Notice: Subject to any disclaimer, the term of this patent is extended or adjusted under 35 U.S.C. 154(b) by 703 days.

(21) Appl. No.: 14/830,401

(22) Filed: Aug. 19, 2015

(65) Prior Publication Data

US 2017/0053441 A1 Feb. 23, 2017

(51) Int. Cl.
| | |
|---|---|
| G09G 5/00 | (2006.01) |
| H04L 29/08 | (2006.01) |
| G06T 19/00 | (2011.01) |
| G06Q 50/16 | (2012.01) |
| G06F 3/01 | (2006.01) |
| G06Q 10/00 | (2012.01) |
| H04L 29/06 | (2006.01) |

(Continued)

(52) U.S. Cl.
CPC .............. *H04L 67/06* (2013.01); *G06F 3/011* (2013.01); *G06Q 10/20* (2013.01); *G06Q 50/163* (2013.01); *G06T 19/006* (2013.01); *F24F 11/30* (2018.01); *F24F 11/52* (2018.01); *F24F 11/62* (2018.01); *G08C 2201/40* (2013.01); *G08C 2201/93* (2013.01); *H04L 12/2809* (2013.01); *H04L 12/2825* (2013.01); *H04L 67/12* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 5,594,908 A | * | 1/1997 | Hyatt ...................... G06F 15/00 710/67 |
| 8,681,178 B1 | | 3/2014 | Tseng |

(Continued)

FOREIGN PATENT DOCUMENTS

| | | |
|---|---|---|
| JP | 2013125330 | 6/2013 |
| WO | 2014100688 | 6/2014 |

OTHER PUBLICATIONS

V431, "BMW augmented reality", posted on Oct., 3, 2007, retrieved from https://www.youtube.com/watch?v=P9KPJIA5yds on Mar. 23, 2017.*

(Continued)

*Primary Examiner* — Weiming He
(74) *Attorney, Agent, or Firm* — Seager, Tufte & Wickhem LLP

(57) ABSTRACT

A system for augmentation of reality-based components and actions related to controllers. Actions may incorporate augmented reality-based wiring, commissioning and monitoring. An augmented reality based application may run in a smart glass, head mounted display (HMD) or in a smart phone, which can augment, for example, a building management system controller and help in wiring, monitoring and commissioning of the controller.

2 Claims, 5 Drawing Sheets

(51) Int. Cl.
  *H04L 12/28*    (2006.01)
  *F24F 11/62*    (2018.01)
  *F24F 11/30*    (2018.01)
  *F24F 11/52*    (2018.01)

(56) References Cited

U.S. PATENT DOCUMENTS

| | | |
|---|---|---|
| 8,810,599 B1 | 8/2014 | Tseng |
| 8,830,267 B2 | 9/2014 | Brackney |
| 2011/0077779 A1* | 3/2011 | Fuller .................... G05B 15/02 |
| | | 700/276 |
| 2013/0169681 A1 | 7/2013 | Rasane et al. |
| 2014/0324418 A1* | 10/2014 | Tsujikawa ........... G10L 21/0364 |
| | | 704/225 |
| 2014/0330511 A1 | 11/2014 | Tison et al. |
| 2015/0193982 A1* | 7/2015 | Mihelich ............... H04W 4/026 |
| | | 345/633 |

OTHER PUBLICATIONS http://techportal.eere.energy.gov/technology.do/techID=540, "Augmented Reality Building Operations Tool—Energy Innovation Portal," 2 pages, printed Nov. 14, 2014.

Metaio, "AR in Service and Maintenance," downloaded from www.metaio.com/ar-service-and-maintenance, 2 pages, prior to Aug. 15, 2015.

* cited by examiner

FIG. 5

| Terminal | Type | Description |
|---|---|---|
| 1 | Power | Connect to 24VAC power |
| 2 | Power | Connect to 24VAC power |
| 5 | UI1 (universal input) | Temperature sensor 1 |
| 6 | AO1 (Analog output) | Actuator Device #10 |
| .. | .. | .. |

51

_(1)_

AUGMENTED REALITY-BASED WIRING, COMMISSIONING AND MONITORING OF CONTROLLERS

BACKGROUND

The present disclosure pertains to controllers, and particularly to particular activities relative to controllers.

SUMMARY

The disclosure reveals a system for augmentation of reality-based components and actions related to controllers. Actions may incorporate augmented reality-based wiring, commissioning and monitoring. An augmented reality based application may run in a smart glass, head mounted display (HMD) or in a smart phone, which can augment, for example, a building management system controller and help in wiring, monitoring and commissioning of the controller.

BRIEF DESCRIPTION OF THE DRAWING

FIG. 5 is a diagram table of example connection data.

DESCRIPTION

Figure 1:
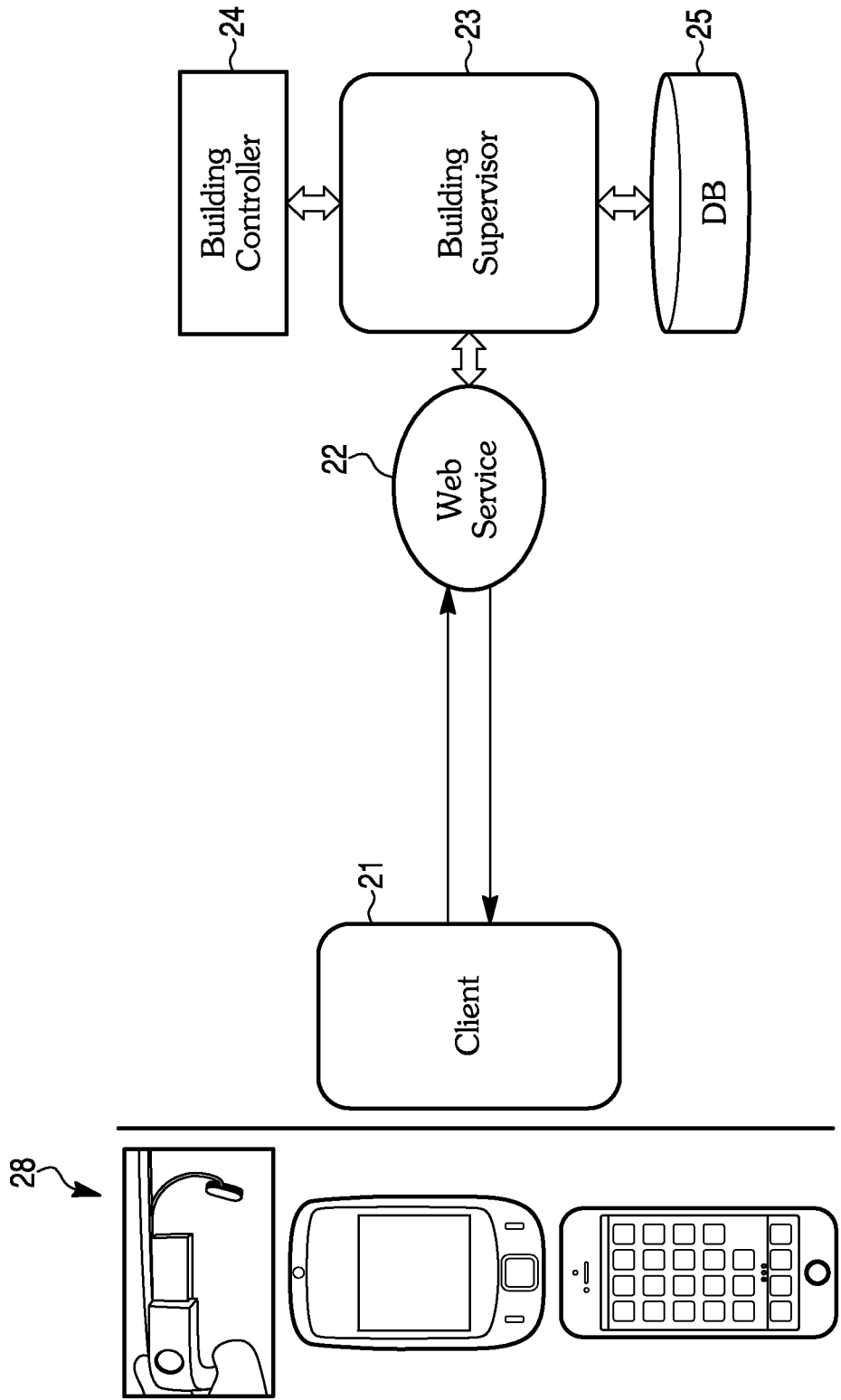
FIG. 1 is a diagram of a system for augmentation of reality-based components and actions related to controllers.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

In BMS projects, each job site may consist of a minimum of one plant controller and unitary controllers to control different applications in a heating, ventilation and air conditioning (HVAC) system. The controllers may be connected to different field devices through input/output (I/O) points of the controller. Often, controllers may have a few onboard input/output (I/O) terminals and I/O modules.

Commissioning may be necessary to ensure that facilities, equipment, and systems are installed and function properly, and are successfully turned over to an owner. During commissioning, based on the engineering, one needs to make sure that all the I/O point terminals are connected to correct field devices. There may be a need to turn on and do fine tuning. For example, the air handler may be confirmed to be leveled. When expanding the facility or adding new field devices, it may be difficult to identify which terminals are connected to what. When a new pump is installed, the proper rotation and flow rate may be verified by changing the data point values.

Outside of the present system and approach, the whole commissioning activity may be done manually by first doing all wiring and then check if all are connected properly by changing the data point and observing if it works. And there is not necessarily an easy way to visualize exactly which I/O point is connected to what and what are the values of it.

The present system and approach may be to have an augmented reality based application which will be running in a smart glass, head mounted display (HMD) or in a smart phone, which can augment the BMS controller.

During a commissioning operation of a building management system (BMS), the client (e.g., an app running in smart glass) may be operated to capture a real-time image of the BMS controller, and this image and other information from the client (such as a bar code, QR code (quick response code) or position information) may be used by the client to determine the identification of the exact controller. The client may use a unique identification to request data such as controller information like device details, data points, and so forth from the building supervisory controller or commissioning tool.

Once the client receives this information, an overlay of building management data, then it may be displayed concurrently with a real-time image of the controller (e.g., a graphical and/or textual element positioned in the display near the equipment I/O terminals providing useful building management data).

An operator of the client may then interact with the overlay objects (selectable icons/buttons or a graphical user interface (GUI)) to retrieve additional building management data such as use case-driven information that may incorporate providing the operator with an actuator-in-hand to tune a controller of the equipment.

The operator may change the data point values by clicking on the values in the GUI. Also, the client may accept a voice input to change a value of a data point and augment the display with the action taken. For example, an action may incorporate Go to Analog Input 1, Write Analog Input 1 with 20, Read Analog Input 1, Read High Limit, Read Description, and so on.

A first case may be commissioning. Client may use directly the controller or an engineering tool for fetching values and sending a command to the controller. During commissioning, when client captures a real-time image of the BMS controller, the client may augment the I/O terminals and display live values for each terminal. The user may be able to select one data point and change the values, and check if everything works as intended. Also, the user may be able to use voice commands for changing the data point values. This may assist in commissioning activity and to better visualize the activity.

FIG. 1 is a diagram of a system for augmentation of reality-based components and actions related to wiring, commissioning and monitoring of controllers. A client 21 may be an application running in a monitor 28 such as smart glass, head mounted display, smart phone, or the like. Client 21 may have a connection with a web service 22. Web service 22 may be connected to a building supervisor 23. Building supervisor 23 may be connected to a building controller 24 and to a database 25.

A second case may be monitoring a building controller. If a building supervisor is already up and running, the building supervisor may act as a data server. If not, the client may access the data from the controller directly as in the first scenario. A client may fetch data from the data collected by the supervisor. It can also act as an interface to fetch real-time values from the controller and send commands to the controllers, such as changing set points, auto to manual override, and so on.

Figure 2:
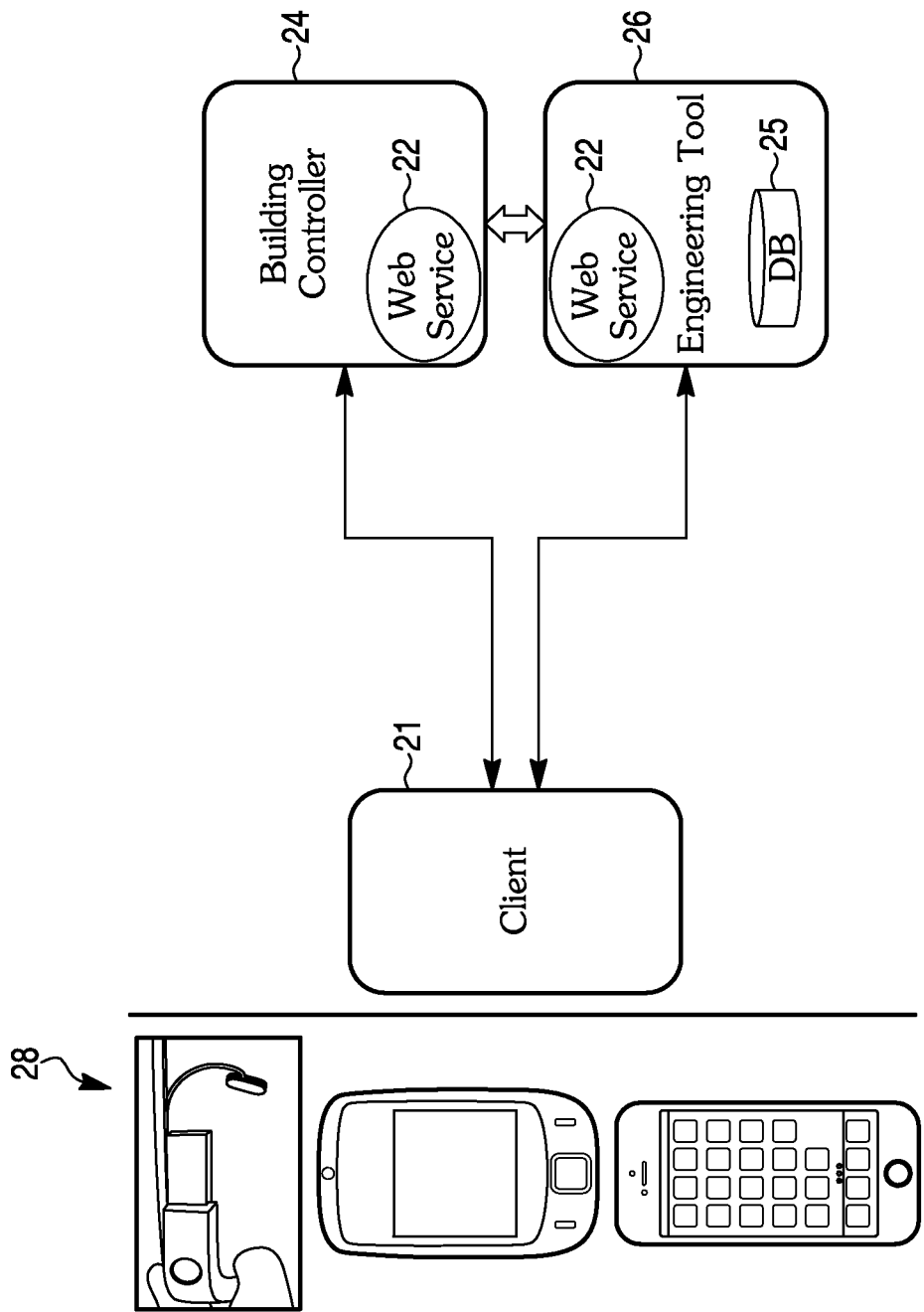
FIG. 2 is a diagram of a system like that of FIG. 1 but a client may be connected to a building controller and engineering tool.

FIG. 2 is a diagram of a system like that of FIG. 1; however, client 21 may be connected to building controller 24 and to an engineering tool 26. Web service 22 may be situated in a building control 24 and in engineering tool 26. Further, database 25 may be situated in engineering tool 26. Client 21, as in FIG. 1, may be an application running in a monitor 28 such as a smart glass, head mounted display, smart phone, or the like.

A user voice or audio captured by the smart glass/smart phone may be processed by the speech service which can internally use one of the existing speech API's and generate the voice commands. Based on these commands, the client may connect to the controller and perform a required operation.

Figure 3:
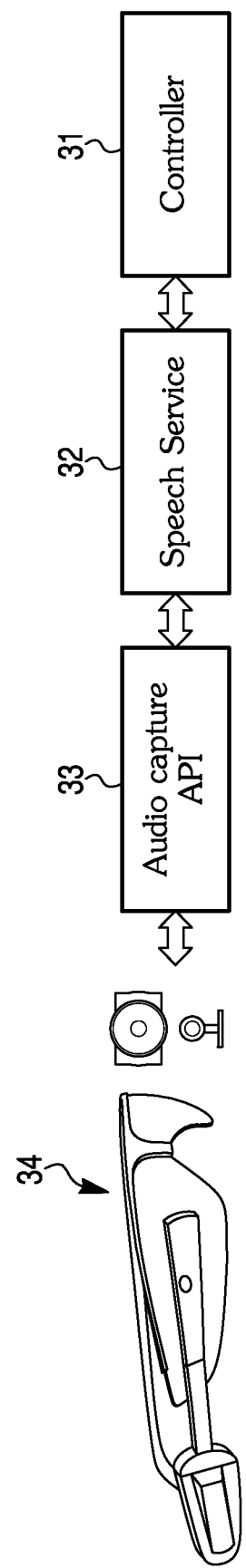
FIG. 3 is a diagram of a controller connected to a speech service module.

FIG. 3 is a diagram of a controller 31 connected to a speech service module 32. An audio capture module 33 may be connected to speech service module 32. A microphone and speaker 34 may be connected to audio capture module 33. Voice messages and signals may be sent and received between the microphone and speaker 34 and controller 31 via audio capture module 33 and speech service module 32.

Augmented reality based application may be used in a portable device to augment the whole wiring process of a controller in a building management system (BMS). During engineering, there may be a need to download the binary application files from the engineering tool followed by wiring. During the wiring, there may be a need to connect different IO terminals from the controller or IO modules to the field devices based on the engineering.

Once a physical wiring process is completed, there may be a need to perform a wiring check, where an installer has to verify that everything is connected properly. For this, an installer may need to check the connectivity, remove a connection and check if correct terminal is connected.

Commissioning may be necessary to ensure facilities, equipment, and systems are installed and function properly, and are successfully turned over to owner. During commissioning, based on the engineering, there may be a need to make sure that all the I/O point terminals are connected to correct field devices and turn on and do fine tuning. For example, the air handler may be confirmed to be leveled. When expanding the facility or adding new filed devices, it may be difficult to identify which terminals are connected to what. When a new pump is installed, the proper rotation and flow rate may be verified by changing the data point values.

In absence of the present system and approach, the whole wiring and commissioning activity may be done manually by first doing all wiring by noting down which terminal is to be connected to which device and then being followed by a commissioning to check if all items are connected properly by changing the data point and observing if it works. And there is not necessarily an easy way to find out which terminals are to be connected to which field devices.

The present system and approach may have an augmented reality based application which can be running either in a smart glass, head mounted display (HMD) or in a smart phone, which will augment the whole process of wiring process.

During controller installation/wiring and commissioning of a building management system of a controller and field devices in building management system, the client (e.g., an app running in smart glass) may be operated to capture a real-time image of the BMS controller, and this image and other information from the client (such as a bar code, QR code (quick response code) or NFC (near field communication) tags) may be used by the client to determine an identification of the exact controller. The client may use the unique identification to request configuration data such as device details, field devices and terminal assignments, and so on from the controller. If these data are not available in the controller, then client may request data from the engineering tool.

Once the client receives this information, it may generate a workflow with a sequence of operation to be done during wiring activity based on the configuration and type of controller. It may augment the display concurrently a real-time image of the controller with a graphical and/or textual element positioned in the display near the equipment I/O terminals providing useful wiring information (for instance, a Connect Analog Output (AO)-1 to the Actuator Device #10). This may actually assist the installation person even though he/she does not necessarily have any information about the engineering. Also, if the installer is new to this field, it may assist the installer to learn the process.

Figure 4:
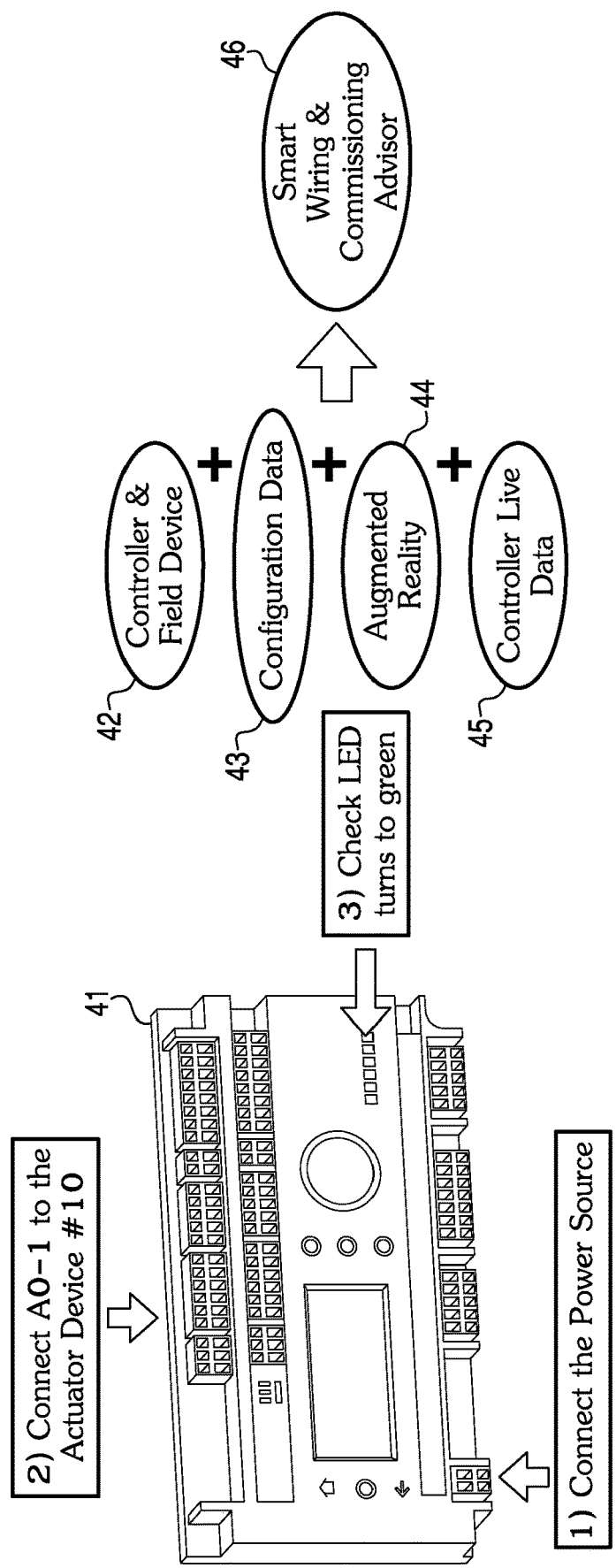
FIG. 4 is a diagram of a layout that may facilitate smart wiring, commissioning and monitoring of controllers and other equipment.

FIG. 4 is a diagram of a layout that may facilitate smart wiring, commissioning and monitoring of controllers and other equipment. A controller 41 may have various connections made to its terminals from field devices, actuators and sensors. Controller 41 may be connected to a client such as an application running in a smart glass, head mounted display, smart phone, and the like. Controller 41, after power and various connections to the controller, an indicator, such as a green LED, may turn on to indicate a level of satisfactory condition of the controller and essential connections. Items featured in FIG. 4 may incorporate one or more controllers and field devices 42, configuration data 43 augmented reality 44 and controller live data 45. These items together may be provided for a smart wiring and commissioning advisor 46. Also, the items may also provide a basis for a monitoring advisor.

During data point creation and terminal assignment with the engineering tool; mandatorily, a user may need to enter details about the field devices which will be connected to the data points. Based on the configuration, a table with all required connections may be created during a binary application generation by the engineering tool and be saved as a file in binary format where the application files are kept. And this file may be downloaded to the controller as part of a normal application download.

Client may fetch table of connection data from the controller or tool and based on the table of connection data, a workflow may be created by the client and which can assist a wiring person in the process with step by step instructions that may incorporate the terminal, a type and description as illustrated with an example in a table 51 of FIG. 5. Instances may involve: terminal 1, power, connect to 24VAC power; terminal 2, power, connect to 24VAC power; terminal 5, UI1 (universal input), connect to temperature sensor 1; terminal 6, AO1 (analog output), connect actuator device 10 to signal source 1; and so on. For a corresponding sequence of steps may incorporate: 1) Connect terminals 1 and 2 to 24VAC power; 2) Connect terminals 3 and 4 to a MS/TP (Master-Slave/Token-Passing) channel; 3) Connect terminal 6 to actuator device #10; 4) . . . ; and so forth.

The sequences of operations and steps may be displayed in the screen and also played in a speaker or head phone as a voice output so that it can be easy for an installer to understand directions for wiring. During each step, a client may accept a voice input for moving to next step. For instance, "Next to next Step", "Skip this Step", "Go to Previous Step", and so on. The steps may really assist in wiring activity and to better visualize the activity.

The user voice or audio may be captured by the smart glass/smart phone and be processed by a speech service which may internally use one of the existing speech API's and generate the voice commands. Based on these commands, client may connect to the controller and perform the required operation.

The present system and approach may be applied to an Eagle™ controller in a Centraline™ platform. An engineering tool used may be from Care™. And a controller may be embellished to expose data. The data may be used by an app running in a smart phone or smart glass to augment the wiring process. The present system and approach may be applied to controller types other than the ones listed and a voice element may be incorporated in addition to others besides Eagle and Care.

The present system and approach may provide an intelligent wiring process, be combined with commissioning process, have better visualization, augment the BMS controller with real data, and provide natural ways to interact with another system such as an HVAC.

To recap, a system having an augmented reality based application for controllers, may incorporate a device that captures a real-time image of a building management system controller, and information such as a bar or quick response code or position information to determine a unique identification (ID) of a controller. The unique ID may be used to request data from a web service hosted as part of a building supervisory or commissioning tool, incorporating device details, and data points from a building management system database. Upon receipt of data, a real-time image of the building management system controller may be presented on a display. An interaction may be made with an overlay of objects on the real time image to retrieve additional data about the building management system controller. The additional data may be incorporated in an actuator-in-hand to tune the building management system controller.

The system may further incorporate a job site under supervision of the building management system controller that has at least one plant controller and one or more unitary controllers that control applications in a heating, ventilation and air conditioning (HVAC) system.

The system may further incorporate a mechanism that converts a voice input to a value change that augments the real-time image on the display. An augmented reality based application may run in a mechanism selected from a group incorporating a smart glass, a head mounted display, a smart phone, a notebook, a tablet, a pad, and the like.

The building management system controller may be connected to one or more field devices through input and output (I/O) points of the building management system controller and the one or more field devices. When a field device is installed and connected to the I/O data points of a controller, proper parameters of the field device may be verified by changing values at the I/O data points.

The real-time image of a controller may incorporate a graphical or a textual element positioned in the display adjacent to I/O terminals. An overlay of building management data fetched with a web service may be displayed concurrently with the real-time image of the building management system controller.

The overlay of building management data may incorporate one or more items selected from a group incorporating objects, selectable icons, selectable buttons and graphical user interfaces. The one or more items may enable a user to retrieve additional building management data. Building management data may incorporate case-driven information that provides a user the actuator-in-hand to tune a controller of equipment.

Values of the data points may be changed by clicking on values shown on a graphical user interface, or values of the data points may be changed with a voice input to a mechanism for converting sound of voice inputs to actions that change values of the data points.

A mechanism having augmented reality-based wiring of controllers, may incorporate a building management system having a controller, and a portable device. The portable device may incorporate an application to augment a wiring process of the controller in the building management system. A sequence of operation for the wiring process of the controller may be displayed through a web service on the portable device. The sequence of operation may incorporate a download of application files from an engineering tool and the directions for the wiring process. The wiring process may incorporate connecting input and output (I/O) terminals of the controller to field devices.

The application to augment the wiring process may be run in a device selected from a group incorporating a smart glass, a head mounted display, a smart phone, a tablet, a pad, a notebook, and the like.

The application may be run in the device to capture a real-time image of the controller. The real-time image and other information may be to determine an identification of the controller. The other information may be from one or more items selected from a group incorporating bar codes, quick response codes, near field communications, and web services.

The identification of the controller may be used to request configuration data of the controller through a web service. The configuration data may be selected from a group incorporating device details, one or more field devices, and terminal assignments for the wiring process.

An approach of augmented reality based activity for a controller, may incorporate augmenting a reality-based application, using the reality-based application in a portable device to augment a wiring process of a controller in a building management system, and displaying a workflow with a sequence of operation through a web service on the portable device. The workflow with the sequence of operation may be based on a configuration or type of the controller. The workflow with the sequence of operation may augment the wiring process of the controller.

The approach may further incorporate downloading application files to the portable device from an engineering tool to provide a basis for the wiring, wiring the controller with connections to one or more field devices through input/output terminals or input/output modules of the controller, and verifying each connection to the one or more field devices from the controller by changing a value of a data point at each input/output terminal the controller.

The portable device may be selected from a group incorporating a smart glass, a head mounted display, a smart phone, a tablet, a notebook, and the like.

The approach may further incorporate operating the reality-based application in the portable device to capture a real-time image of the controller, obtaining other information about one or more items selected from a group incorporating bar codes, quick response codes, and near field communication tags, using the real-time image and the other information with the portable device to determine a unique identification of the controller, and using the unique identification to request configuration data about the controller through a web service. If the configuration data are not available from the controller, then engineering data may be requested from the web service hosted as a part of an engineering tool. The engineering data may incorporate details of one or more field devices, the portable device, and assignments of the terminals of the controller. The one or more field devices may support a heating, ventilation and air conditioning (HVAC) system.

The approach may further incorporate generating the workflow with the sequence of operation for augmenting the wiring process based on the configuration or type of the controller. The workflow with the sequence of operation may augment the displaying of the portable device concurrently of the real-time image of the controller with a graphical and/or textual element positioned in the display near the input/output terminal providing wiring information.

The real-time image of the controller may augment the input/output terminals and show live data point values at the input/output terminals. A live data point value may be selected and be changed. A live data point value may be changed with voice commands via a speech processor to the portable device.

During data point creation and terminal assignment with the engineering tool, details about the field devices which are connected to the data points may be entered by a user. Based on the configuration, a table with virtually all required connections may be created during an application by the engineering tool and saved as a file in a binary format where the application files are stored.

The file with the table may be downloaded to the controller as part of a normal download of an application. When the controller has the file with the table, the controller may expose data of the file through a web service over a net. When the controller cannot expose the data of the file, then the file may be exposed by the engineering tool through a sub service.

Based on the table with virtually all required connections, the work flow may assist a wiring process with step-by-step instructions. The instructions may be displayed on a screen of the display of the portable device or played as a voice output on the portable device.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system having an augmented reality based application for installing and tuning unitary controllers of a building management system, wherein unitary controllers control different applications in a heating, ventilation and air conditioning (HVAC) system comprising:
   a device that captures a real-time image of a unitary controller of a plurality of unitary controllers under the direction of a plant controller of a building management system and information such as a bar or quick response code or position information which determines a unique identification (ID) of the unitary controller of the plurality of unitary controllers within a building,
   wherein the unitary controllers control different applications in a heating, ventilation and air conditioning (HVAC) system under the direction of the plant controller of the building management system; and
   wherein:
   transmission of the unique ID to a web service device serves to request data from the web service hosted as part of a building supervisory controller or commissioning tool, the data comprising device details and data points associated with the unitary controller from a building management system database, the device details and data points are returned to the device;
   upon receipt of data, the real-time image of the unitary controller is presented on a display with an overlay of objects related to the unitary controller;
   an interaction is made with the overlay of objects on the real-time image of the unitary controller to retrieve additional data about the unitary controller;
   the additional data are incorporated in an actuator-in-hand to tune the unitary controller;
   the plant controller is connected to one or more field devices through input and output (I/O) points of the plant controller and through input and output (I/O) points of one or more unitary controllers to the one or more field devices; and
   when a field device is installed and connected to the I/O data points of a unitary controller, the system is configured and adapted to verify proper parameters of the field device by changing values at the I/O data points.

2. The system of claim 1, wherein:
   values of the data points are changed by clicking on values shown on a graphical user interface; or
   values of the data points are changed with a voice input to a mechanism for converting sound of voice inputs to actions that change values of the data points.

* * * * *